Wm. Weaver's Insect Trap.

71346

PATENTED
NOV 26 1867

Witnesses: Jno. A. Ellis, Jas. White

Inventor: Wm. Weaver
Per J. H. Alexander, Atty.

United States Patent Office.

WILLIAM WEAVER, OF PHŒNIXVILLE, PENNSYLVANIA.

Letters Patent No. 71,346, dated November 26, 1867.

IMPROVED INSECT-TRAP.

The Schedule referred to in these Letters Patent and making part of the same.

TO ALL WHOM IT MAY CONCERN:

Be it known that I, WILLIAM WEAVER, of Phœnixville, in the county of Chester, and State of Pennsylvania, have invented certain new and useful Improvements in Insect-Traps; and I do hereby declare that the following is a full, clear, and exact description thereof, reference being had to the accompanying drawings and to the letters of reference marked thereon, which form a part of this specification, in which—

Figure 1:
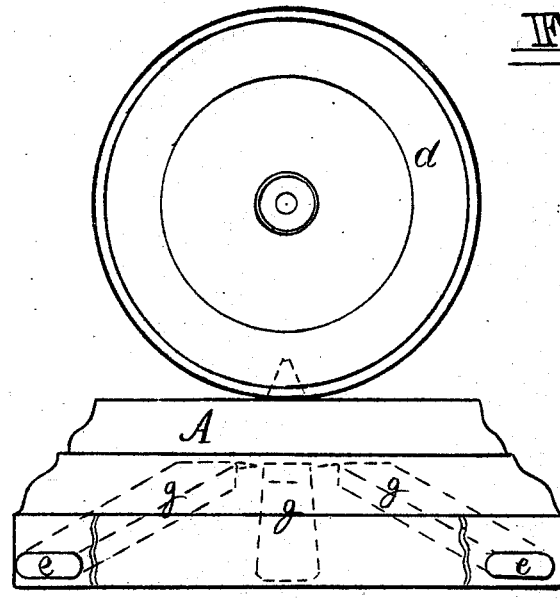

Figure 1 is a side view, and

Figure 2:
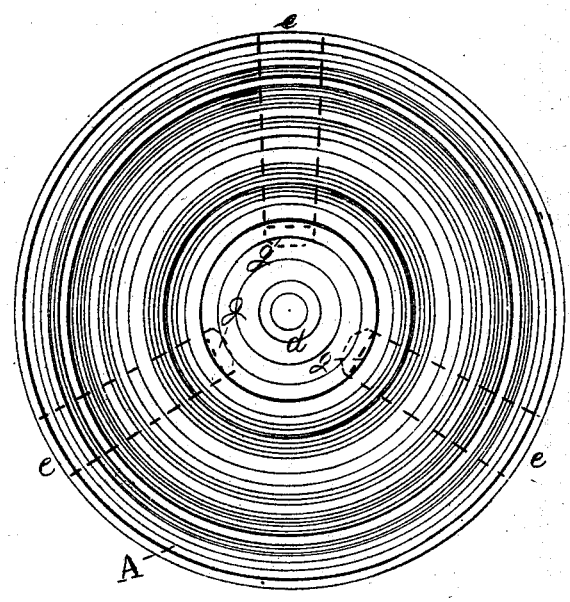

Figure 2 a plan of my device.

The nature of this invention consists in the employment of a box provided with tubes, so constructed and arranged that when the insects for which it is designed once effect an entrance, all modes of egress are seemingly cut off, and they are thus entrapped, to be destroyed by opening the lid and pouring in hot water.

To enable others skilled in the art to make and use my invention, I will now describe its construction.

A represents a box, which is provided with the hinged cover $a$. This box may be of tin or any other material which is suitable, and may be made either round or angular. $e\ e\ e$ represent openings on the side and near the bottom of the box A. Upon the inner side of these openings are soldered or otherwise secured the tubes $g\ g\ g$. These tubes should be placed at or about the angle represented in fig. 1, and must be tapering from their lower to their upper ends, as seen in fig. 2. $h\ h\ h$ are projections on the upper ends of said tubes. These projections should be bent downwards and towards the bottom of the trap A. As this trap is designed to catch roaches, ants, snails, &c., &c., it may be baited on the inner side with such condiments as such insects are fond of. It will thus be seen that from the peculiar construction and arrangement of the tubes $g\ g\ g$, insects, when once entrapped, will find it all but impossible to extricate themselves.

What I claim, and desire to secure by Letters Patent, is—

The box A, when provided with tubes $g\ g\ g$ arranged and constructed as set forth.

In testimony that I claim the foregoing as my own, I affix my signature in presence of two witnesses.

WILLIAM WEAVER.

Witnesses:
P. G. CAREY,
MAHLON MILLER.